April 27, 1948.   C. M. KIMBERLIN   2,440,610
ENGINE COOLING LIQUID HEATER
Filed March 7, 1946   3 Sheets-Sheet 2

INVENTOR.
CARNA M. KIMBERLIN
BY
Smith & Well

April 27, 1948.  C. M. KIMBERLIN  2,440,610
ENGINE COOLING LIQUID HEATER
Filed March 7, 1946  3 Sheets-Sheet 3

INVENTOR.
CARNA M. KIMBERLIN
BY
Smith & Wells

Patented Apr. 27, 1948

2,440,610

UNITED STATES PATENT OFFICE 2,440,610

ENGINE COOLING LIQUID HEATER

Carna M. Kimberlin, Spokane, Wash., assignor to Red Ball Manufacturing Company, Spokane, Wash., a corporation of Washington Application March 7, 1946, Serial No. 652,760

6 Claims. (Cl. 219—38)

My present invention relates to a heater and more particularly to a heater such as is used for maintaining the cooling liquid of an internal combustion engine at the proper temperature when the engine itself is idle.

All forms of internal combustion engines require a cooling medium when operating and in most cases the cooling medium is a liquid which is circulated around the engine cylinders in what is commonly known as a cooling system to maintain a proper working temperature of the engine. When the engine is at rest, the cooling liquid rapidly takes on the temperature of the adjacent air so that if low temperatures prevail the cooling liquid will freeze. Anti-freeze solutions are used for cooling liquids but when such liquids are used the temperature of the engine is permitted to get so low in cold weather that difficulty is also encountered in starting the engine. The purpose of my invention is to provide a simple effective heating unit which can supply heat to the cooling liquid in sufficient quantities to maintain the cooling liquid above the danger point due to freezing and at a temperature which will make the starting of the engine an easy matter.

The heating unit preferably uses electricity as a source of energy but it is so constructed so as to readily adapt itself for heating by an oil burner where electricity is not available. In my prior Patents 2,266,216 and 2,367,356 heaters of this general type are shown. However, the present heater is directed to an improved construction which is particularly adapted for control of the circulation of cooling liquids through the heater and assembly of the parts of the heater in a novel manner.

It is the purpose of the present invention to provide a new heater casing and valved inlet construction whereby the inlet to the heater casing will allow the cooling liquid to enter, even though the engine may be tilted to a substantial degree from the horizontal and whereby the valve itself will prevent reverse flow of the liquid at all times.

It is another purpose of my invention to provide a simplified heater casing whereby the assembly of the parts and the maintenance thereof in assembled position is accomplished by a central stem which holds the casing parts assembled and serves as a valve stem for guiding the inlet valve.

The novel features which I consider characteristic of my invention are set forth in the appended claims. The invention itself, however, both as to its organization and its method of operation, together with additional objects and advantages thereof, will best be understood from the following drawings in which:

Figure 1:
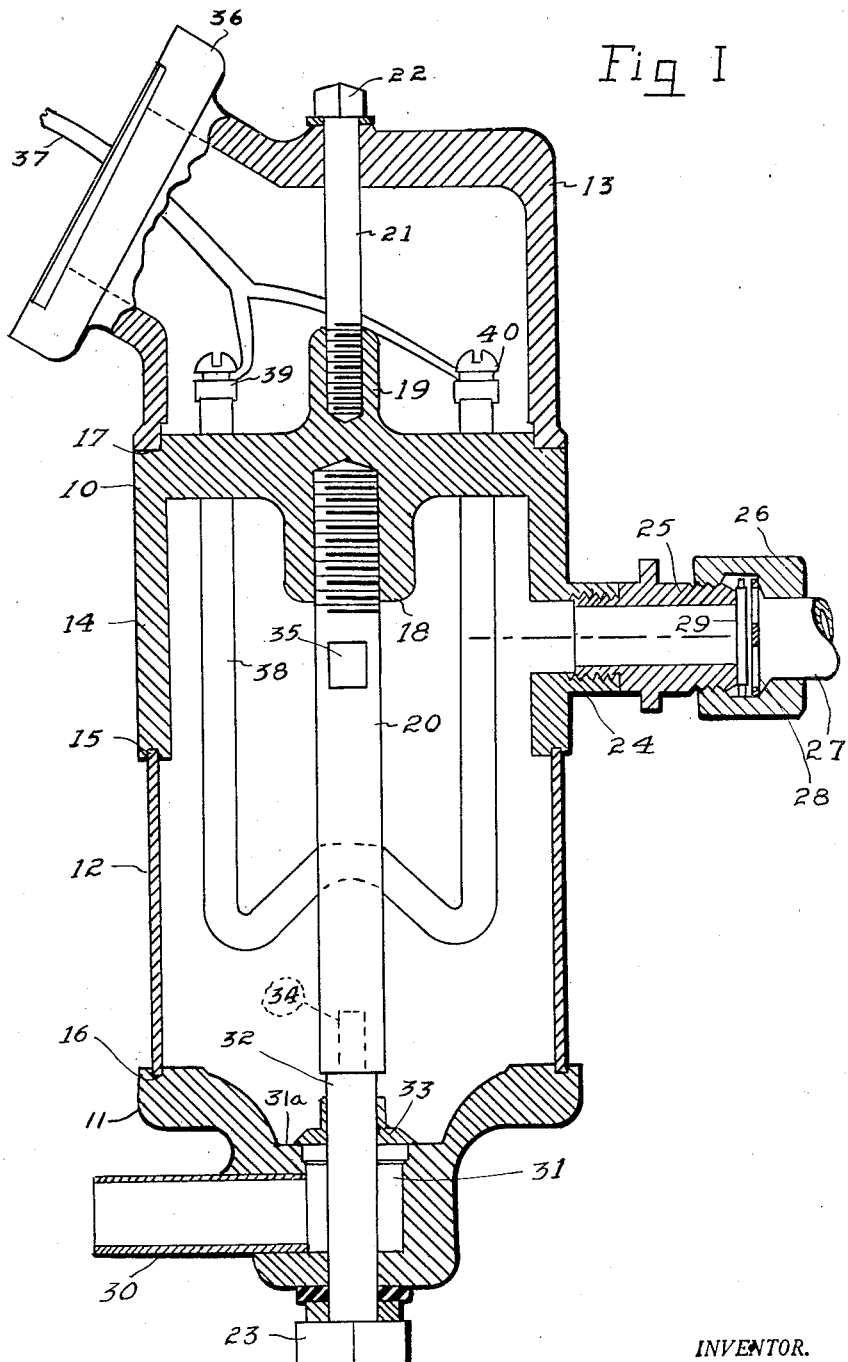
Figure 1 is a vertical sectional view through a heater for internal combustion engines embodying my invention.

Referring now to the drawings and particularly to Figure 1. The heater shown is of the electrical type wherein the cooling liquid is heated by electrical energy. The heater casing is made up of a main header 10, a second header 11, a sleeve 12, and a cap 13. The header 10 has an angular flange 14 which projects toward the header 11 and has a recessed shoulder at 15 to receive one end of the sleeve 12. The header 11 is recessed at 16 to receive the other end of the sleeve 12. The header 10 is cut back as shown at 17 to provide a shoulder for the cap 13. The header 10 has two oppositely directed bosses 18 and 19 which are threaded to receive rods 20 and 21. The rod 21 extends through the cap 13 and is provided with a head 22 to clamp the cap in position on header 10. The rod 20 extends downwardly through the header 11 and is provided with a head 23 by which it may be turned to clamp the sleeve 12 between the two headers 10 and 11.

The header 10 has a liquid outlet nipple 24 on the flange 14. This nipple receives a valve seat 25 which is threaded on the exterior to accommodate a coupling 26 for coupling a flexible conduit 27 to the casing. The coupling mounts a spider 28 and a valve disk 29 is free to move toward and away from the valve seat 25 to allow cooling liquid to flow out through the conduit 27 but prevent its flow inward.

The header 11 mounts an inlet conduit 30 and has a central well 31 that opens upwardly into the interior of the casing. The rod 20 has a reduced portion 32 extending through the well 31 and a valve 33 is slidable on the reduced portion 32. The adjacent face 31a around the well 31 is machined to provide a seat for the valve 33. The reduced portion 32 preferably is a separate piece from the main rod 20 and has a threaded stem 34 that extends into a threaded socket on the rod 20. In order that the rod 20 may be seated in the boss 18 before applying the reduced portion 32, I provide flattened surfaces 35 on the rod.

The cap 13 has a mounting flange 36 which also provides an opening for the entry of an electrical cable 37 to supply current through a heating coil 38 that is carried by the header 10. By releasing the cap 13 the connections 39 and 40 to the heating coil are readily accessible.

Figure 2:
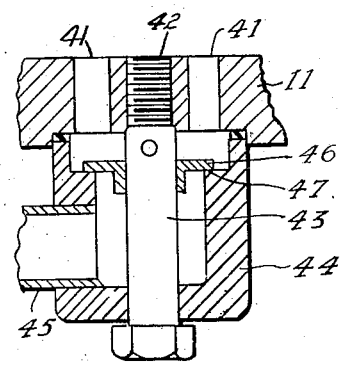
Figure 2 is a fragmentary sectional view through the heater inlet showing a modified valve mounting.

In Figure 2 of the drawings I have shown a modified inlet and valve construction which is adapted for use where the header 11 is mounted in some other fashion than by means of the rod 20. In this case, the header is provided with apertures 41 and has a threaded aperture 42 to receive a bolt 43 that serves to clamp a valve seat and inlet casing 44 to the header. The inlet conduit is shown at 45. A valve 46 is slidably mounted on the bolt 43 and the casing 44 has a valve seat 47 for the valve 46.

Figure 3:
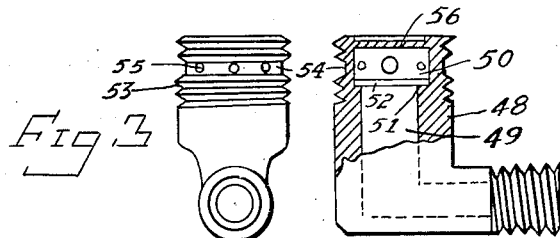
Figure 3 is a view in side elevation of another form of valve.
Figure 4:
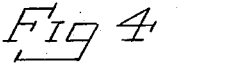
Figure 4 is a view partly in side elevation and partly in section of the valve shown in Figure 3.
Figure 5:
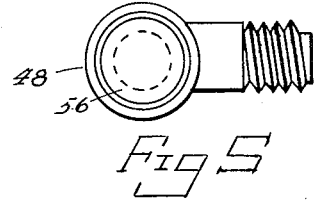
Figure 5 is a plan view of the valve shown in Figure 3.
Figure 8:
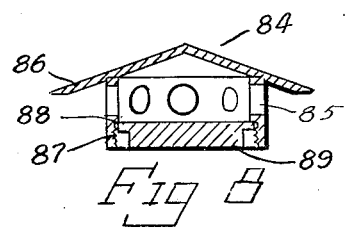
Figure 8 is a fragmentary sectional view through the top of the heat exchange tube of the heater shown in Figure 6.
Figure 9:
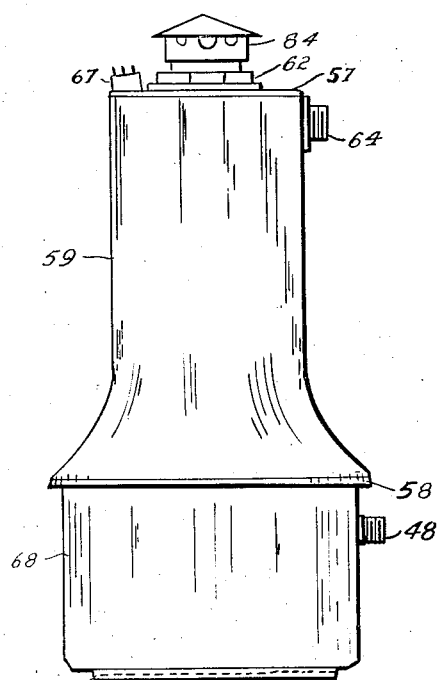
Figure 9 is a view in side elevation of the heater shown in Figure 6.
Figure 7:
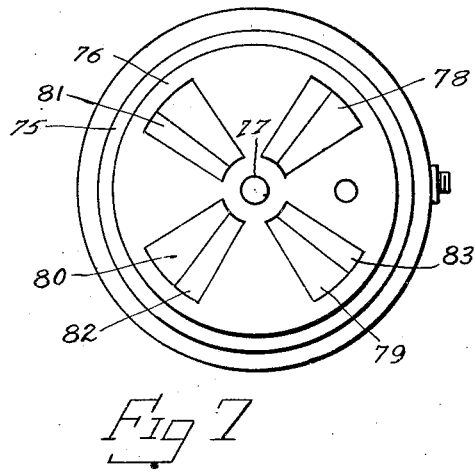
Figure 7 is a bottom plan view of the oil burner casing.
Figure 6:
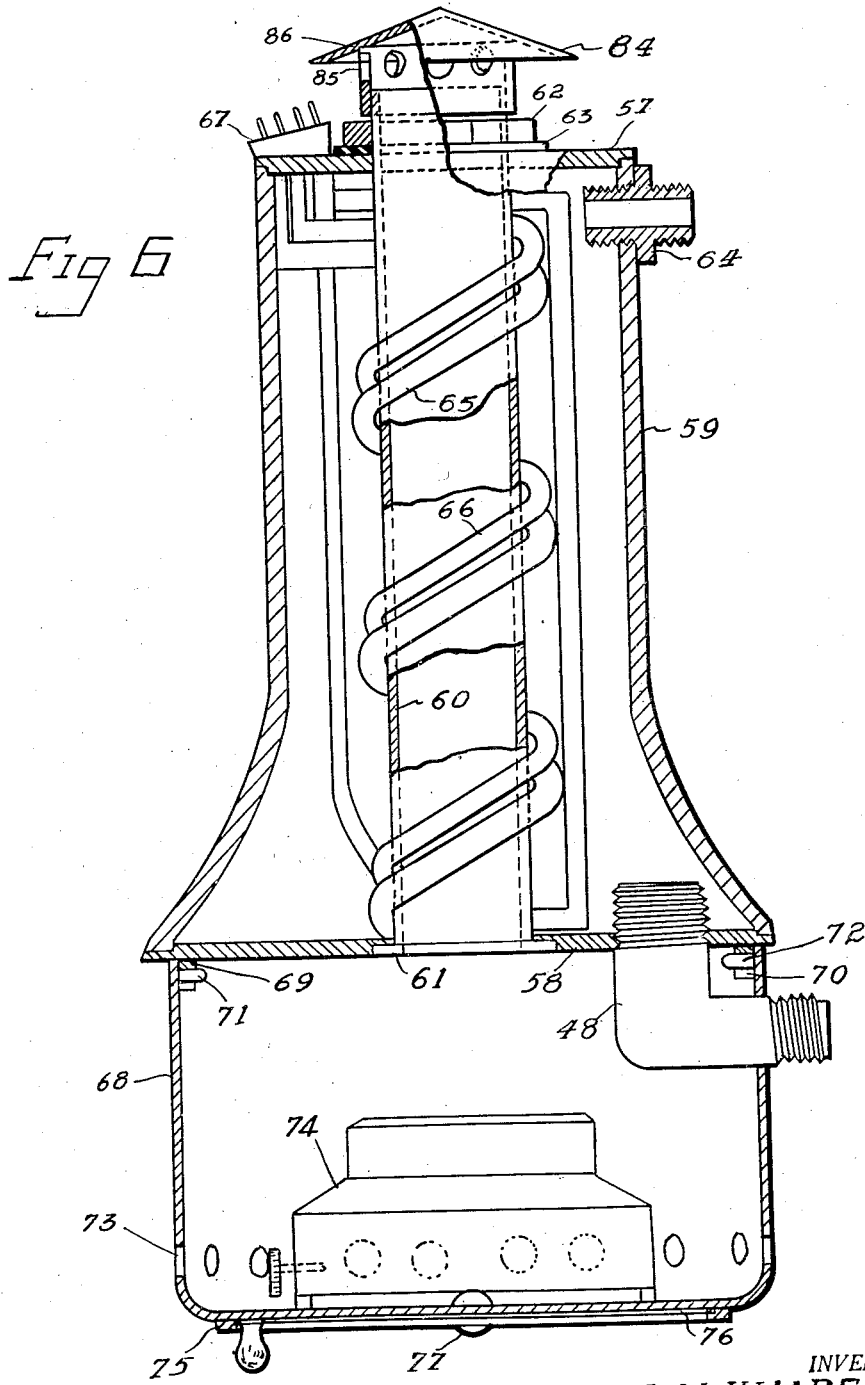
Figure 6 is a vertical sectional view through a modified form of heater adapted to utilize either electricity or a fuel oil for heating purposes.

In Figures 3, 4, and 5 details of a further modification of the valve inlet construction are shown. The valve inlet in this case comprises an L-shaped nipple 48. The inlet passage 49 of the nipple is enlarged at 50 and has a shoulder 51 for seating a disk valve 52. The mounting threads 53 of the nipple are cut away at 54 and a multiplicity of apertures 55 are provided so that liquid entering through the nipple can flow out through the apertures 55. A plug 56 closes the enlarged portion of the passage 49.

Referring now to Figures 6 to 9 inclusive, these figures show a modified heater construction which is adapted for either electrical or an oil burner heat source. In this form of invention the heater casing has the two headers or ends 57 and 58 with the main body portion 59 clamped between them. The clamp consists of a heat exchange tube 60 which has a flange at 61 for engaging the header 58 and which is threaded to receive a clamp nut 62 for clamping the header 57 in place. A gasket 63 is used for sealing around opening in the header 57. In this form of the invention the valved inlet nipple 48 is used for letting liquid into the casing 59 and an outlet nipple 64 is mounted adjacent to the header 57 in the casing 59.

This heating unit is equipped with both electrical and oil burning heating means so that it may be used when electrical energy is available and shifted to oil burning when the electrical energy is not available. Two heating elements 65 and 66 are coiled about the tube 60 and are connected to a plug type electrical connector 67 which is mounted on the header 57. One of the heating elements has a higher heating capacity than the other so as to supply more heat whenever it is needed. For example, the smaller heating element may be a 1000 watt unit and the large heating element a 3000 watt unit.

The oil burner comprises a burner casing 68 which is adapted to be mounted by two bayonet slots in two plugs 69 and 70 provided on the header 58 and two pins 71 and 72 on the interior of the casing 68. The casing 68 has air inlet apertures 73. A burner 74 of any suitable type such as the "Coleman" burner is mounted in the casing 68. The bottom of the casing has means for supplying air to the burner with means whereby the amount of air supplied can be varied. A flanged ring 75 is secured on the bottom of the casing to guide a central disk 76 which is pivoted on a rivet 77 at the center of the casing. The casing bottom has a series of apertures 78, 79 and 80 spaced around the rivet 77 as a center. The disk 76 is also apertured as indicated at 81, 82, and 83 so that by rotating the disk the apertures in the disk and in the bottom of the casing can be more or less aligned to control the inlet of air.

The upper end of the tube 60 is covered by a cap 84 which is threaded on to the upper end of the tube 60. This cap has a series of apertures 85 opening laterally beneath the top cover 86 to let the gases of combustion escape. The cap 84 has its threaded portion 87 reduced so as to provide a shoulder 88 against which a disk 89 can be clamped to close the upper end of the tube 60 when the device is used with the electrical heating units. It will be appreciated that a great deal of the heat would be lost from the tube 60 if this tube were left open for the passage of air when the heat was being supplied by the electrical units 65 and 66.

In both forms of the invention the rod 20 and the tube 60 serve as central stems for securing the heater casing parts together. This is of considerable advantage in assembly, also in cleaning and repairing the heater. The stem 20 serves also to mount the inlet valve, thus further simplifying the heater.

From the foregoing description it is believed to be evident that I have provided a simple and effective heater for the cooling liquid of an internal combustion engine which can be attached to the cooling system of any engine and utilized to maintain the cooling liquid at the proper temperature when the engine is idle.

Having thus described my invention, I claim:

1. A portable device for use in connection with internal combustion engine cooling systems to maintain the engine cooling liquid warm during the periods of idleness of the engine, said device comprising a liquid chamber, inlet and outlet conduits for said chamber, heating means extending into the chamber for heating liquid therein and valve means in said inlet operable to close the inlet against reverse flow of liquid, said valve means comprising a valve body to which the inlet conduit is secured, an internal seat in said body, a mounting member coaxial with the seat and extending through the body into the chamber and securing the body to the chamber, and a valve slidable axially on said mounting member for engaging said seat.

2. A portable device for use in connection with internal combustion engine cooling systems to maintain the engine cooling liquid warm during the periods of idleness of the engine, said device comprising a main header, a stem projecting from one side of the header, a second header, a liquid inlet having a valve seat in the second header, a sleeve between the headers, said stem extending through the valve seat and having means thereon to clamp the two headers to said sleeve, and a valve slidable on the stem for engaging the seat, said stem having means thereon to limit the valve movement away from the seat.

3. A portable device for use in connection with internal combustion engine cooling systems to maintain the engine cooling liquid warm during the periods of idleness of the engine, said device comprising a main header, a stem projecting from one side of the header, a second header, a liquid inlet having a valve seat in the second header, a sleeve between the headers, said stem extending through the valve seat and having means thereon to clamp the two headers to said sleeve, and a valve slidable on the stem for engaging the seat, said stem having means thereon to limit the valve movement away from the seat, said main header having an annular flange recessed to receive said sleeve, and an outlet nipple on said flange.

4. A portable device for use in connection with internal combustion engine cooling systems to maintain the engine cooling liquid warm during the periods of idleness of the engine, said device comprising a main header, an electric heating element mounted on the header, a cap on the header, a second header, a stem on the header, a second header secured by the stem, a sleeve interposed between said headers and forming therewith a liquid chamber, one of said headers having an inlet therein and the other having an outlet therein, and valves for said openings, one of said valves opening inward and the other one outward for establishing unidirectional flow through the chamber.

5. A portable device for use in connection with internal combustion engine cooling systems to maintain the engine cooling liquid warm during the periods of idleness of the engine, said device comprising two spaced apart headers, one carrying a heating element that extends toward the other header and the other header having a liquid inlet passage therein, a tubular sleeve between the headers and a stem extending through the sleeve and clamping the headers against the sleeve, said central stem having a valve mounted thereon, and a valve seat on said other header cooperating with the valve to prevent reverse flow of liquid through the inlet passage.

6. A portable device for use in connection with internal combustion engine cooling systems to maintain the engine cooling liquid warm during the periods of idleness of the engine, said device comprising two spaced apart headers, one carrying a heating element that extends toward the other header and the other header having a liquid inlet passage therein, a tubular sleeve between the headers and a stem extending through the sleeve and clamping the headers against the sleeve, said central stem being hollow whereby to serve as a heat exchange tube for liquid in the heater.

CARNA M. KIMBERLIN.

REFERENCES CITED

The following references are of record in the file of this patent:

UNITED STATES PATENTS

| Number | Name | Date |
|---|---|---|
| 1,360,437 | Papini | Nov. 30, 1920 |
| 1,864,035 | Wyner et al. | June 21, 1932 |
| 1,884,507 | Bacher | Oct. 25, 1932 |
| 2,266,216 | Kimberlin | Dec. 16, 1941 |
| 2,380,132 | Walther | July 10, 1945 |

FOREIGN PATENTS

| Number | Country | Date |
|---|---|---|
| 365,663 | Great Britain | Jan. 28, 1932 |